United States Patent
Schliesch

(10) Patent No.: US 12,130,135 B2
(45) Date of Patent: Oct. 29, 2024

(54) APPARATUS, IN PARTICULAR JOYSTICK, FOR DETECTING THE TILT OF A PIVOT LEVER

(71) Applicant: MAX BAERMANN GESELLSCHAFT MIT BESCHRÄNKTER HAFTUNG, Bergisch Gladbach (DE)

(72) Inventor: Thomas Schliesch, Kürten (DE)

(73) Assignee: Max Baermann Gesellschaft mit beschränkter Haftung, Bergisch Gladbach (DE)

( * ) Notice: Subject to any disclaimer, the term of this patent is extended or adjusted under 35 U.S.C. 154(b) by 162 days.

(21) Appl. No.: 18/000,176

(22) PCT Filed: May 18, 2021

(86) PCT No.: PCT/EP2021/063049
§ 371 (c)(1),
(2) Date: Nov. 29, 2022

(87) PCT Pub. No.: WO2021/239498
PCT Pub. Date: Dec. 2, 2021

(65) Prior Publication Data
US 2023/0228553 A1 Jul. 20, 2023

(30) Foreign Application Priority Data
May 29, 2020 (DE) .................... 10 2020 114 464.4

(51) Int. Cl.
G01B 7/30 (2006.01)
G01B 7/14 (2006.01)
(Continued)

(52) U.S. Cl.
CPC ............... *G01B 7/30* (2013.01); *G01D 5/145* (2013.01); *H01F 7/021* (2013.01); *G05G 2009/04755* (2013.01)

(58) Field of Classification Search
CPC ... G01B 7/00; G01B 7/14; G01B 7/30; G01D 5/14; G01D 5/244; G06F 3/033
See application file for complete search history.

(56) References Cited

U.S. PATENT DOCUMENTS

| 2003/0094941 A1 | 5/2003 | Mizutani et al. |
| 2010/0265176 A1 | 10/2010 | Olsson et al. |

(Continued)

FOREIGN PATENT DOCUMENTS

| DE | 20 2012 006 199 U1 | 9/2013 |
| WO | 2006/106454 A1 | 10/2006 |
| WO | 2014/00864 A1 | 1/2014 |

OTHER PUBLICATIONS

European Patent Office, International Search Report for PCT App. No. PCT/EP2021/063049, Jul. 30, 2021, pp. 1-5.
(Continued)

*Primary Examiner* — Neel D Shah
(74) *Attorney, Agent, or Firm* — Cahn & Samuels, LLP

(57) ABSTRACT

The invention relates to an apparatus, in particular of a joystick, for detecting a tilt angle of a pivot lever (2, 2'), having a pivot lever (2, 2') which can be tilted about a fulcrum (S) relative to a predefined axis (Z), having a magnetic device which is arranged on the pivot lever (2, 2') and can be moved with the latter, and a sensor device (5) which is at a distance from the pivot lever (2, 2') and is designed to detect a magnetic field, and having an evaluation device for determining the tilt angle on the basis of the detected magnetic field, wherein the magnetic device has at least one cylindrical permanent magnet (3, 3') with uniaxial magnetization (4). The apparatus according to the invention (Continued)

Figure 1:
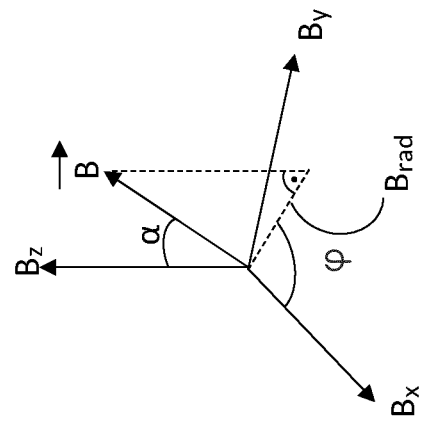
Figure 1:
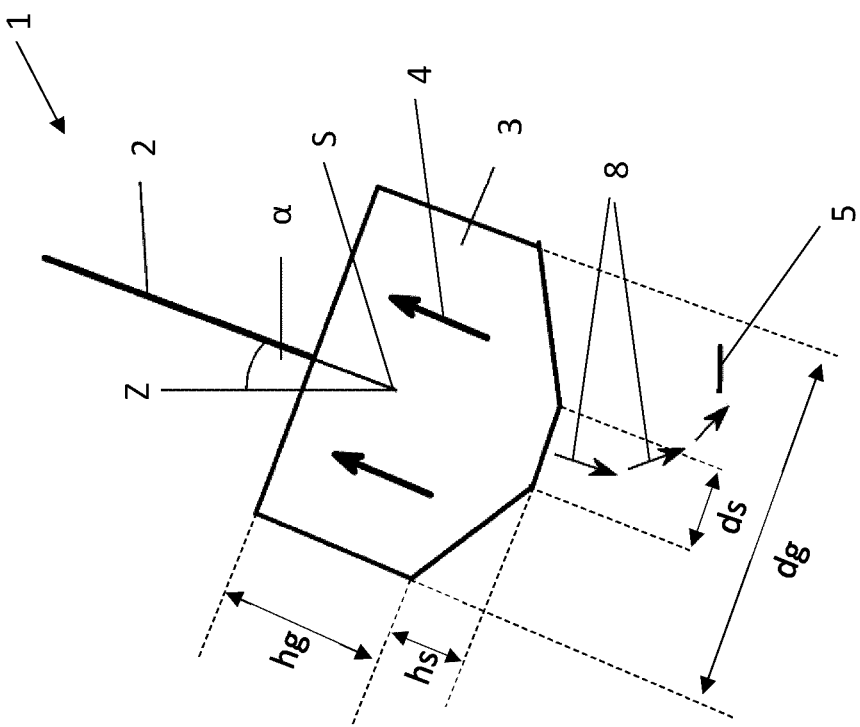

is characterized in that the pivot lever (2, 2') is held, with respect to its axis (Z), so that it can be translationally deflected in the direction of the sensor device (5), and the permanent magnet (3, 3'), on its end facing the sensor device (5), tapers radially cylindrically along the extent of a pre-defined axial end section. The invention also relates to a permanent magnet (3, 3') for such an apparatus.

20 Claims, 3 Drawing Sheets

(51) Int. Cl.
  G01D 5/14    (2006.01)
  G01D 5/244   (2006.01)
  G06F 3/033   (2013.01)
  H01F 7/02    (2006.01)
  *G05G 9/047*     (2006.01)

(56) References Cited

U.S. PATENT DOCUMENTS

2016/0290495 A1* 10/2016 Bak .................. G01D 5/142
2016/0306379 A1* 10/2016 Zils .................. G05G 5/08

OTHER PUBLICATIONS

European Patent Office, International Preliminary Report on Patentability for PCT App. No. PCT/EP2021/063049, May 13, 2022, pp. 1-23.
Deutsches Patent-und Markenamt, Examination Report for DE 10 2020 114 464.4, Jan. 19, 2021, pp. 1-10.

* cited by examiner

APPARATUS, IN PARTICULAR JOYSTICK, FOR DETECTING THE TILT OF A PIVOT LEVER

The invention relates to an apparatus, in particular a joystick, for detecting a tilt angle of a pivot lever, having a pivot lever which can be tilted about a fulcrum relative to a predetermined axis, having a magnetic device which is arranged on the pivot lever and can be moved with the latter, and a sensor device which is at a distance from the pivot lever and is designed to detect a magnetic field, and having an evaluation device for determining the tilt angle on the basis of the detected magnetic field, wherein the magnetic device has at least one cylinder-like permanent magnet with axial magnetization and wherein the pivot lever is mounted so that it can be translationally deflected coaxially with its axis in the direction of the sensor device.

Such apparatus are well known in this field, for example in the design of a joystick or control device for a working machine. By tilting the pivot lever about the predetermined axis from its rest position, i.e. starting from a polar angle of zero at which the axis of the pivot lever is coaxial with the predetermined axis, in these apparatus the cylinder-like, in particular cylindrical permanent magnet connected to the pivot lever and moved with it is also tilted relative to the sensor device, which fact is reflected by a change in the magnetic field components perpendicular and lateral to the predetermined axis and thus in a change in the corresponding sensor signal. The evaluation device determines the tilt angle searched for, which is also referred to as polar angle, from the sensor value, e.g. in a spherical coordinate system suitable here.

To extend the functionality of the pivot lever in such control devices or joysticks, there is a need to move the pivot lever not only azimuthally and polar about a predefined fulcrum, but additionally transversely in a direction coaxial with the axis of the pivot lever. The described detection of the polar angle α independent of the azimuthal circular position of the pivot lever between 0 and 360° is massively disturbed by the additional degree of freedom of the lever arm, since the magnetic field prevailing at the sensor location depends both on the set polar angle and on the translational deflection of the pivot lever coaxial with its axis from its rest position.

A generic device is disclosed in US 2016/0306379 A1 and DE 20 2012 006 199.

The invention is based on the problem of further developing a conventional apparatus for detecting a tilt angle of a pivot lever in such a way that the tilt angle can be determined by simple evaluation of a detected magnetic field, essentially independently of a translational deflection of the pivot lever, which is performed coaxially with its axis over a predetermined deflection range. Preferably, this determination of the tilt angle shall also be enabled over common angle ranges of the tilt or polar angle in the range between approximately 0 and 25°.

The present invention already solves this problem with an apparatus for detecting a tilt angle of a pivot lever having the features of claim 1.

The apparatus according to the invention is characterized in that the permanent magnet tapers radially over a predetermined axial end section toward the axial front side on its end facing the sensor device.

The apparatus according to the invention is based on the basic idea of providing a simple determination of the tilt angle of the pivot lever in an apparatus with extended functionality in that the cylinder-like permanent magnet with uniaxial magnetization in an axial end section facing the sensor device has a specific design for setting a predetermined relationship between the magnetic field detected at the location of the sensor device and the tilt or polar angle so that the determination of the tilt angle is substantially independent of the circular position of the lever (azimuth angle) and/or the translational deflection of the pivot lever coaxial with its axis. The apparatus according to the invention with extended functionality can thus exhibit also translational mobility in the direction of an axis of the pivot lever in addition to the mobility with respect to the fulcrum for setting a predetermined polar angle and at the same time a predetermined azimuth angle and can be configured to determine the position of the pivot lever with respect to a polar angle and independently of a set azimuth angle and also independently of a translational deflection of the pivot lever by means of the detection of the magnetic field prevailing at a stationary location of the permanent magnet moved with the pivot lever.

The expression "radially tapered in the manner of a cylinder" means a radial taper which need not in every case be circular, in particular circular corresponding to a truncated cone, with respect to the axis of the permanent magnet. For example, a curvature on the surface of the permanent magnet in the taper region may also have concave or convex sections respectively concave or convex deviations from the ideal circular shape. The expression " . . . the pivot lever is . . . held or mounted so as to be translationally deflectable in the direction of the sensor device" means that the pivot lever can be moved translationally with at least one movement component in the predetermined direction. With the pivot lever untilted, the pivot lever axis is parallel to the predetermined axis so that the translational movement can take place parallel or coaxially with the predetermined axis. The expression "uniaxial magnetization of the permanent magnet" may denote a uniaxial magnetization of the permanent magnet which is parallel to the axis of the permanent magnet that can be in the form of a cylinder, for example. "In the form of a cylinder or cylinder-like shape" can mean that at least one cylindrical section is included in the axial direction and/or that rotational symmetry exists over at least one axial section.

Further embodiments of the invention as well as further features according to the invention are stated in the following general description, the drawing figures, the description of the drawing figures and in the subclaims.

Preferably, the apparatus according to the invention comprises a stationary part, in particular a housing, where the sensor device can be arranged or fixed, and a part which is movable relative thereto, namely said pivot lever, which can be supported in such a way that it is rotatable and tiltable with respect to a fulcrum for setting a predefined polar angle and a predefined azimuth angle, wherein, in addition, the pivot lever can be supported or held so as to be translationally movable coaxially with its axis that preferably passes through the fulcrum.

Preferably, it can be provided that the sensor device, which is designed for providing measurement values for determining the tilt angle in an evaluation device, is arranged to detect both an axial magnetic flux density, i.e. a magnetic flux density parallel to a predefined direction, and also a magnetic flux density lateral to the predefined direction, i.e. a radial magnetic flux density. In order to detect a lateral magnetic flux density independently of the respective circular position of the pivot lever, it can be provided that the sensor device is designed as a three-component sensor which can determine the magnetic flux density in three mutually perpendicular directions. Preferably, it can be provided that the sensor device is designed as a Hall sensor. However, other magnetic field sensors could be used as well, for example magneto-resistive sensors, which would still be within the scope of the present invention.

The evaluation device for the determination of the tilt angle can be arranged to form a ratio of measurement signal values of the sensor device, where the measurement signals set in relation with each other indicate a respective magnetic flux density in mutually different, in particular mutually perpendicular directions. It can be provided, for example, that a measurement signal value that indicates the magnetic flux density in the radial direction is set in relation with a measurement signal of magnetic flux density in a perpendicular direction thereto, i.e., in the predefined direction. This predefined direction corresponds to the axis of the tilted pivot lever or the axis of the permanent magnet when the pivot lever is in the zero position with respect to the polar angle. The ratio thus determined can, in one embodiment, be proportional to the searched tilt angle, wherein, by forming the ratio, changes in the radial or lateral magnetic field generated by a translational displacement of the pivot angle are substantially compensated for by corresponding changes in the axial magnetic field generated by a translational movement of the pivot lever due to the specific design of the permanent magnet. According to the invention, this makes the influence of a translational movement of the pivot lever on the determination of the tilt angle neglectable within usual tilt angle ranges between about +/−30°. In this embodiment, the described design of the permanent magnet in the form of a radially tapering cylinder or in the manner of a truncated cone over the extent of the predetermined axial end section can be such that the described ratio of the two measurement signal values is proportional to the searched tilt angle or polar angle and, moreover, at least over usual tilt angle ranges between about +/−30°, is independent of any transverse deflection of the pivot lever in the direction of its axis.

Moreover, by the formation of the ratio of measurement signal values, possibly existing magnetic material variations in the permanent magnet and/or variations in the magnetic field caused by temperature changes can be compensated for or at least partially removed. In particular, with the described determination of the tilt angle and the above-described shape of the permanent magnet, it can be achieved that the determined ratios of the measurement signal values directly indicate the tilt angle—under certain circumstances except for a proportional factor—so that a simple linear relationship between the quotient of the measurement signal values and the searched tilt angle is provided.

In a preferable embodiment, the permanent magnet of the apparatus according to the invention can also include a purely cylindrical section in the axis direction, which is joined by a section which radially tapers over a predetermined cylinder-shaped axial end section. In particular, it can be provided that the permanent magnet is designed in the manner of a truncated cone, in particular as a pure truncated cone, on the front side thereof facing the sensor device. In particular, it can be provided that the permanent magnet is manufactured in one piece and comprises at least the two aforementioned axially adjoining sections so that the base area of the truncated cone section can be identical with the base area of the cylinder section. The apparatus according to the invention may also have a permanent magnet of such a type comprising an axial bore, for example to accommodate the pivot lever in sections.

It should be made clear that the expression "axially adjoining sections of the permanent magnet" or " . . . the permanent magnet can . . . include a purely cylindrical section in the axis direction which is joined by a section which radially tapers over a predetermined cylinder-like axial end section" refers to the shape of the permanent magnet, and the same terms "axial" or "radial" can identify different directions with regard to the magnetic flux at the sensor device. Identity of the directions exists in such operating situations in which the pivot lever is in its zero position with respect to the polar angle.

It can be provided to adapt the height and the plane surface (top surface) of the truncated cone to the diameter and the total height of the cylinder-like permanent magnet as well as to the range of the sensor distance to the permanent magnet in such a way that a linear dependence between the searched tilt angle and a ratio respectively a quotient of two magnetic field measurement values in mutually perpendicular directions exists as described above, wherein preferably the two magnetic field components are the axial magnetic field component and the radial magnetic field component with respect to the predetermined axis, i.e., to the axis of the permanent magnet when the pivot lever is in the zero position with respect to the polar angle.

Expediently, the magnetic device may include a single permanent magnet that can be designed rotationally symmetrical. The relative arrangement of the pivot lever to the permanent magnet can be such that at the pole position of the pivot lever, i.e. when the pivot lever is not tilted, the predetermined axis of the pivot lever extends parallel to the axis of the permanent magnet, in particular coaxially with this axis.

Preferably, it can be provided that the fulcrum of the pivot lever on the predetermined axis of the pivot lever is arranged within the axial extent of the permanent magnet. In particular, it can be provided that this fulcrum is arranged within the pure cylinder section of the permanent magnet, i.e., axially outside the radially tapering end section of the permanent magnet. In particular, it can be provided that the fulcrum is arranged axially centered within the cylinder section of the permanent magnet.

However, the apparatus according to the invention is not limited to embodiments in which the fulcrum of the pivot lever is arranged within the permanent magnet. In this respect it may be provided that the fulcrum of the pivot lever is arranged on the predetermined axis above the permanent magnet.

Generally, magnets can be used as permanent magnets for the apparatus according to the invention which, with respect to their shape, can be designed as described and can be uniaxially magnetized. For example, for designing a permanent magnet that can be employed in the apparatus according to the invention, a plastic-bonded magnet can be used, in particular an injection-molded or pressed magnet. Pressed plastic-bonded magnets can comprise, for example, NgFeB powder embedded in a thermosetting epoxy resin matrix in which case these magnets can be pressed in tools. Injection molded magnets can be manufactured, for example by embedding hard ferrite or rare-earth magnetic powder in thermosetting plastics. To provide permanent magnets with high remanence, permanent magnets manufactured as sintered magnets can also be used in the apparatus according to the invention. NdFeB can be a typical basic material also in this case. As the manufacturing tolerances of sintered magnets are higher than those of plastic-bonded, injection-molded magnets, it is easily possible to use sintered magnets in the apparatus according to the invention, since the determination of the tilt angle in the apparatus according to the invention is relatively insensitive with regard to manufacturing tolerances.

The distance of the permanent magnet moved by the pivot lever relative to the sensor device in the zero position of the pivot lever with respect to the polar angle can be approximately between 4 mm and 10 mm, in particular between 5 mm and 8 mm, depending on the embodiment, and this distance can refer to an operating situation with the pivot lever not deflected transversely. Provision can be made to set the transverse deflection of the pivot lever relative to its axis to a value between 1 mm and 3 mm, in particular a value between 1 mm and 2 mm. For example, the device can be designed in such a way that the pivot lever can be moved transversely over the specified distance on a stop, for example to trigger an electrical contact.

The further design of the permanent magnet for the apparatus according to the invention may depend on predetermined boundary conditions in the construction of the apparatus, in particular the joystick. For example, it may be provided that the diameter of the purely cylindrical section has a value which is between 4 mm and 5 mm, in particular about 4 mm. For example, the axial height of the purely cylindrical section of the permanent magnet can be set to a value that is between 1.5 mm and 3 mm, in particular between 1.8 mm and 2.8 mm. Furthermore, the axial height of the radially tapering end section of the permanent magnet can be set, for example, to a value which is between 1.2 mm and 1.6 mm. The diameter of the top surface of the tapered section may, for example, have a value that is between 0.9 mm and 3 mm, depending on the embodiment.

Particularly in such embodiments of the invention in which the fulcrum of the pivot lever is arranged on the predetermined axis of the pivot lever above the axial extent of the permanent magnet, e.g., with a distance to the permanent magnet of >0 mm and ≤1 mm, it can be provided that the diameter of the purely cylindrical section presents a value between 5 mm and 7 mm, in particular about 6 mm. In such embodiments, the axial height of the purely cylindrical section of the permanent magnet can be set to a value which is between 1.5 mm and 2.5 mm, in particular 2.0 mm. Further in such embodiments, the axial height of the radially tapering end section of the permanent magnet can be set to a value which is between 0.75 mm and 1.4 mm, in particular 1 mm. The diameter of the top surface of the tapering section in such embodiments can present a value which is between 0.75 mm and 1.5 mm, in particular 1 mm. In those of the mentioned embodiments in which the fulcrum of the pivot lever is arranged on the predetermined axis of the pivot lever above the axial extent of the permanent magnet as described, e.g., with a distance to the permanent magnet of >0 mm and 1 mm, the distance between the sensor device and the permanent magnet in the translationally non-deflected state in the predetermined Z direction can be between 5.5 mm and 8 mm, in particular 6.1 mm, whereas by a translational deflection of the pivot lever in the Z direction at a zero position of the pivot lever with respect to the polar angle, said distance may decrease to a value between about 4.5 mm and 6.5 mm, in particular a value of 4.8 mm.

Particularly advantageous designs of a permanent magnet for the apparatus according to the invention, especially with respect to the described linearity of the quotient of the magnetic field components and the searched tilt angle, are implementable if the ratio of the diameter of the purely cylindrical section of the permanent magnet to the total height of the permanent magnet is between 1.2 and 1.3. The ratio of the purely cylindrical section of the permanent magnet to the axial height of the tapering section of the permanent magnet can in particular be between 1.45 and 1.65. The ratio of the diameter of the top surface of the tapering section to the axial height of the tapering section can in particular be between 0.7 and 2.

Figure 2:
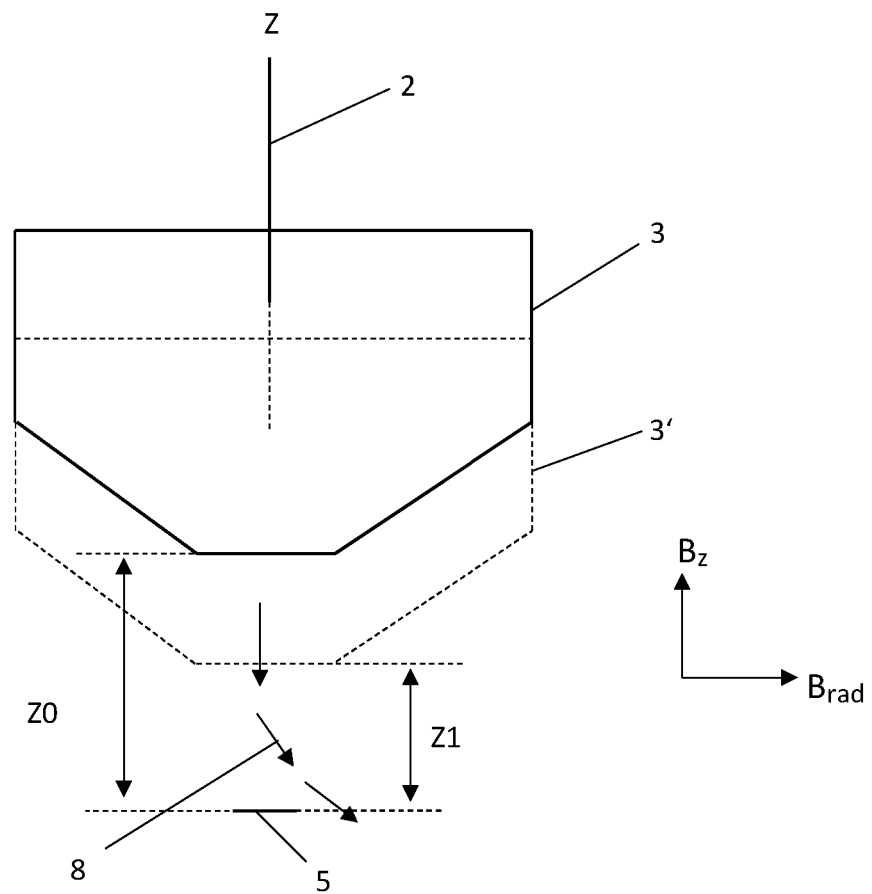
Figure 3:
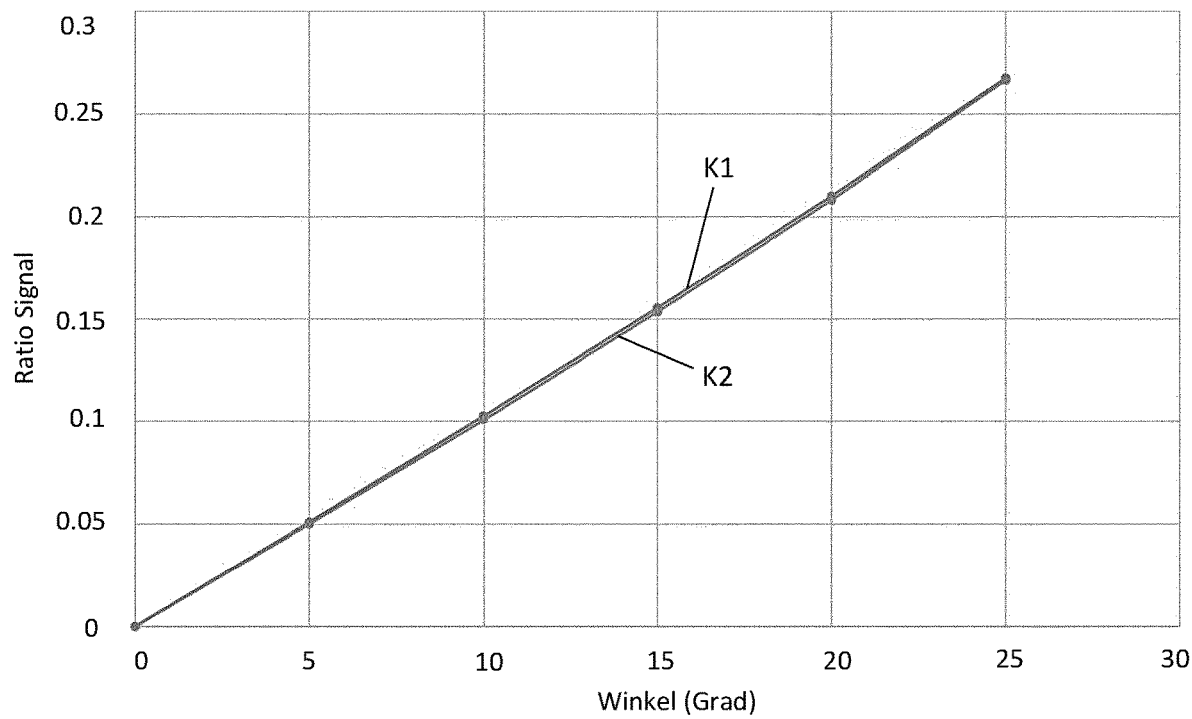

Embodiments of the invention will now be described in more detail with reference to the attached drawings in which it shown by FIG. 1 a schematic representation of an apparatus according to the invention with the pivot lever tilted;

FIG. 2 a schematic representation of the apparatus according to the invention shown in FIG. 1 in a pole position of the pivot lever, but in two translationally different deflection positions; and FIG. 3 the progression of a quotient of two magnetic field components as a function of the tilt angle α at two translationally different deflections of the pivot lever.

The invention will be described in the following with reference to the design of a joystick as used, for example, in computer games. FIG. 1 shows a schematic representation of such a joystick 1, which comprises a pivot lever 2 and fixed to it a permanent magnet 3, which is cylinder-like and presents a uniaxial magnetization 4 parallel to the axis of the permanent magnet. The pivot lever 2 is rotatably supported about a fulcrum S, with the tilt angle α specified in FIG. 1 representing the polar angle by which the pivot lever 2 is deflected about a predetermined axis, here the Z axis, which in the embodiment described extends coaxially with the symmetry axis of the permanent magnet 3 at a tilt angle α=0. In this respect, the pivot lever 2 with the magnet 3 fixed to it is movably supported relative to a stationary part of the apparatus, for example a housing of the joystick 1, both not shown in FIG. 1. Arranged on the stationary part of the apparatus 1 is a three-component Hall sensor 5 which is arranged to detect the magnetic field emanating from the magnet regarding its magnetic field components Bz, By, Bx. Exemplary magnetic field lines are identified by reference sign 8. In the embodiment described, the pivot lever 2 can be tilted about the fulcrum S by a polar angle α and also pivoted in the X-Y plane perpendicular to the predetermined axis respectively to the Z direction. This pivoting with respect to the circular position of the lever can be specified by specifying an azimuth angle φ, see the coordinate system of the magnetic field components Bx, By, and Bz shown in FIG. 1, which here is to be considered stationary to the sensor device in contrast to the pivot lever which is movable as described. As shown, the radial respective to the lateral field component Brad is fixed by the two components Bx and Br. The detection of the magnetic field components Bx, By, and Bz by means of the three-component sensor 5 allows the determination of the deflection by the polar angle α of the pivot lever 2 to the predetermined axis Z and moreover also the determination of the azimuth angle φ in the circular plane X, Y.

Supporting the pivot lever 2 of the apparatus according to the invention is realized in the embodiment described in such a way that the pivot lever is translationally movable coaxially with its axis towards the stationarily supported three-component sensor 5 over a predetermined extent, in one embodiment by 1.3 mm for example. This translational movement of the pivot lever 2, 2' and thus the magnet 3, 3' in the direction of the axis of the pivot lever by the distance (z0−z1) is schematically shown in FIG. 2, where for simplification of illustration the tilt angle α is set equal to zero. In this specific operating situation, the axis of the pivot lever is coaxial with the predetermined axis (Z direction) in this respect.

To provide for a comparatively simple determination of the tilt angle α and for a simple relationship between the measured magnetic field and the searched tilt angle also in the case of a design of the apparatus 1 according to the invention, the permanent magnet 3 of the apparatus 1 according to the invention is configured in a specific way. As apparent from FIGS. 1 and 2, the permanent magnet 3 has a pure cylindrical shape over its axial height hg, whereas in a second section joining the first section of the magnet 3, the latter has an axial extent hs. In the embodiment described, this second section is truncated cone-shaped with circular diameter and with a top surface diameter ds, whereas the base area of the cylindrical section and also of the radially tapering section joining the cylindrical section presents a diameter dg.

In the embodiment described so far, the diameter dg of the purely cylindrical section of the permanent magnet can be 4.1 mm, the axial height hg of the cylindrical section can be 2 mm, the axial height hs of the truncated cone can be 1.3 mm, and the diameter ds of the top surface of the truncated cone can be 0.95 mm. In this embodiment, the distance between the sensor device and the permanent magnet in the translationally non-deflected state in the predetermined direction Z can be 6.1 mm, whereas the distance decreases to 4.8 mm due to the translational deflections of the pivot lever in the Z direction when the pivot lever is in its zero position with respect to the polar angle.

The described arrangement of the pivot lever which is movable relative to the stationary part of the device 1 according to the invention and has the permanent magnet which is also moved by it, and the exemplary geometrical design of the permanent magnet 3 simplify in particular the determination of the tilt angle α corresponding to the polar angle by which the pivot lever is pivoted relative to the predetermined axis, i.e., the Z axis. With the apparatus according to the invention, this determination can be made independently of a possible transverse displacement of the pivot lever in the direction of its axis. For the determination of the searched tilt angle, the apparatus 1 according to the invention includes an evaluation device connected on the input side thereof to the output of the sensor device and receiving measurement signals representing the magnetic field components Bx, By, and Bz, see FIG. 1. The evaluation device, e.g., in the form of a microprocessor having an interface for receiving and converting the sensor signals, is arranged in the apparatus according to the invention for forming a ratio (quotient) between a value for the lateral (radial) magnetic flux density Brad and a value for the measured axial magnetic flux density Bz, where the radial magnetic flux density Brad is composed of the magnetic components Bx, By perpendicular to the axial direction, see FIG. 1. It should be noted once again that the axial direction of the flux density coincides with the axis of the pivot lever respectively to the permanent magnet when the pivot lever assumes its zero position with respect to the polar angle α.

FIG. 3 shows the specified ratio Brad/Bz as a function of the tilt angle α for the distance Z1 in the curve K1 and for the distance Z0 with the curve K2. Recognizably, the design of the apparatus according to the invention results in a linear relationship between the ratio Brad/Bz independently of the translational deflection of the pivot lever in the direction of the axis of the pivot lever. In addition to providing the stated linear relationship between the ratio Brad/Bz, the design according to the invention further enables a simple determination of the tilt angle, since this can be determined without any special complex calculation solely from forming the ratio of the signal values output by the sensor device.

In the embodiment described, the permanent magnet of the apparatus according to the invention is manufactured as a sintered magnet with an NgFeB base material. In another embodiment, the permanent magnet may be manufactured as a plastic-bonded magnet.

The skilled person will appreciate that the apparatus according to the invention can be implemented with other geometrical designs of the permanent magnet within the scope of the claims. Exemplary embodiments are given below with the design parameters of the device discussed.

| Pos. | 1 | 2 | 3 | 4 | 5 |
|---|---|---|---|---|---|
| dg [mm] | 4.0 | 4.1 | 4.1 | 4.0 | 5.0 |
| hg [mm] | 2.0 | 2.0 | 2.0 | 2.0 | 2.5 |
| hs [mm] | 1.25 | 1.3 | 1.3 | 1.3 | 1.55 |
| ds [mm] | 1.0 | 0.95 | 0.95 | 1.50 | 3.0 |
| Z0 [mm] | 6.1 | 6.1 | 6.9 | 7.4 | 7.6 |
| Z1 [mm] | 4.8 | 4.8 | 4.9 | 6.1 | 6.3 |

The apparatus designed according to the invention and listed under pos. 1 to 5 can be identical in structure, except for the parameters specified in the above table, and all show a linear progression of the quotient Brad/Bz relative to the searched tilt angle α.

LIST OF REFERENCE SIGNS 1 joystick
2, 2' pivot lever
3, 3' magnet, permanent magnet
4 magnetization
5 three-component sensor, sensor device
8 magnetic field line
S fulcrum
α polar angle
Bx, By
Bz, Brad magnetic field components
B magnetic field
dg diameter
ds diameter
hg axial height
hs axial height
K1, K2 curve

The invention claimed is:

1. An apparatus for detecting a tilt angle (α) of a pivot lever (2 2'), the apparatus comprising:
a pivot lever (2, 2') which can be tilted about a fulcrum (S) relative to a predetermined axis (Z),
a magnetic device which is arranged on the pivot lever and can be moved with the latter,
a sensor device (5) which is spaced apart from the pivot lever and is designed to detect a magnetic field, and
an evaluation device for determining the tilt angle on the basis of the detected magnetic field,
wherein the magnetic device has at least one permanent magnet (3, 3') with a cylindrical shape and uniaxial magnetization,
wherein the pivot lever (2, 2') is mounted so as to be deflectable in translation coaxially with its axis in the direction of the sensor device (5),
wherein the permanent magnet (3, 3') tapers radially over the extent (hs) of a predefined axial end section towards the axial front side on its end facing the sensor device.

2. The apparatus according to claim 1, wherein the sensor device (5) is arranged to detect both an axial magnetic flux density (Bz) and also a lateral (radial) magnetic flux density (Brad).

3. The apparatus according to claim 1, wherein the evaluation device for the determination of the tilt angle ($\alpha$) is arranged to form a ratio of two measurement signal values of the sensor device (5),
wherein the two measurement signals indicate a respective magnetic flux density (Bz, Brad) in mutually different directions.

4. The apparatus according to claim 3, wherein the permanent magnet (3, 3') is truncated cone-shaped on its front side facing the sensor device (5).

5. The apparatus according to claim 4, wherein in an operating position with the pivot lever (2, 2') untilted, the fulcrum (S) of the pivot lever (2, 2') is arranged on the predetermined axis (z) within the axial extent of the permanent magnet.

6. The apparatus according to claim 4, wherein in an operating position with the pivot lever (2, 2') untilted, the fulcrum (S) of the pivot lever (2, 2') is arranged on the predetermined axis (z) above the permanent magnet.

7. The apparatus according to claim 6, wherein in the operating position with the pivot lever (2, 2') untilted, the axis of the permanent magnet (3, 3') extends coaxially with the predetermined axis.

8. The apparatus according to claim 1, wherein the permanent magnet (3, 3') is designed rotationally symmetrical.

9. The apparatus according to claim 1, wherein the permanent magnet (3, 3') is a plastic-bonded, injection-molded or pressed magnet.

10. A permanent magnet (3, 3') for use in an apparatus according to claim 1, which has a cylinder-like shape with uniaxial magnetization and tapers radially towards the axial front side at an axial end face over the extension (hs) of a predetermined axial end section, wherein the permanent magnet (3, 3') has, in its axial extent (hg+hs), a purely cylindrical section and a truncated cone with identical base area, the latter adjoining the cylindrical section in the axial direction.

11. The permanent magnet (3, 3') according to claim 10, wherein the diameter (dg) of the purely cylindrical section of the permanent magnet (3, 3') is between 4 mm and 5 mm, and/or the axial height (hg) of the purely cylindrical section is between 1.8 mm and 2.8 mm, and/or the axial height (hs) of the truncated cone is between 1.2 mm and 1.6 mm, and/or the diameter (ds) of the top surface of the truncated cone is between 0.9 mm and 3 mm.

12. The permanent magnet (3, 3') according to claim 11, wherein the ratio of the height (hg) of the purely cylindrical section of the permanent magnet to the axial height (hs) of the truncated cone is between 1.45 and 1.65.

13. The permanent magnet (3, 3') according to claim 11, wherein the ratio of the diameter of the top surface (ds) of the truncated cone to the axial height (hs) of the truncated cone is between 0.7 and 2.

14. The permanent magnet (3, 3') according to claim 10, wherein the ratio of the diameter (dg) of the purely cylindrical section of the permanent magnet to the total height (hg+hs) of the permanent magnet is between 1.2 and 1.3.

15. Use of a permanent magnet (3, 3') having a cylinder-like shape with uniaxial magnetization and tapers radially at an axial end face over the extent (hs) of a predetermined axial end portion towards the axial end face in a device according to claim 1.

16. The apparatus according to claim 1, wherein the permanent magnet (3, 3') is truncated cone-shaped on its front side facing the sensor device (5).

17. The apparatus according to claim 16, wherein in an operating position with the pivot lever (2, 2') untilted, the axis of the permanent magnet (3, 3') extends coaxially with the predetermined axis.

18. The apparatus according to claim 1, wherein in an operating position with the pivot lever (2, 2') untilted, the fulcrum (S) of the pivot lever (2, 2') is arranged on the predetermined axis (z) within the axial extent of the permanent magnet.

19. The apparatus according to claim 1, wherein in an operating position with the pivot lever (2, 2') untilted, the fulcrum (S) of the pivot lever (2, 2') is arranged on the predetermined axis (z) above the permanent magnet.

20. The apparatus according to claim 1, wherein in an operating position with the pivot lever (2, 2') untilted, the axis of the permanent magnet (3, 3') extends coaxially with the predetermined axis.

* * * * *